UNITED STATES PATENT OFFICE.

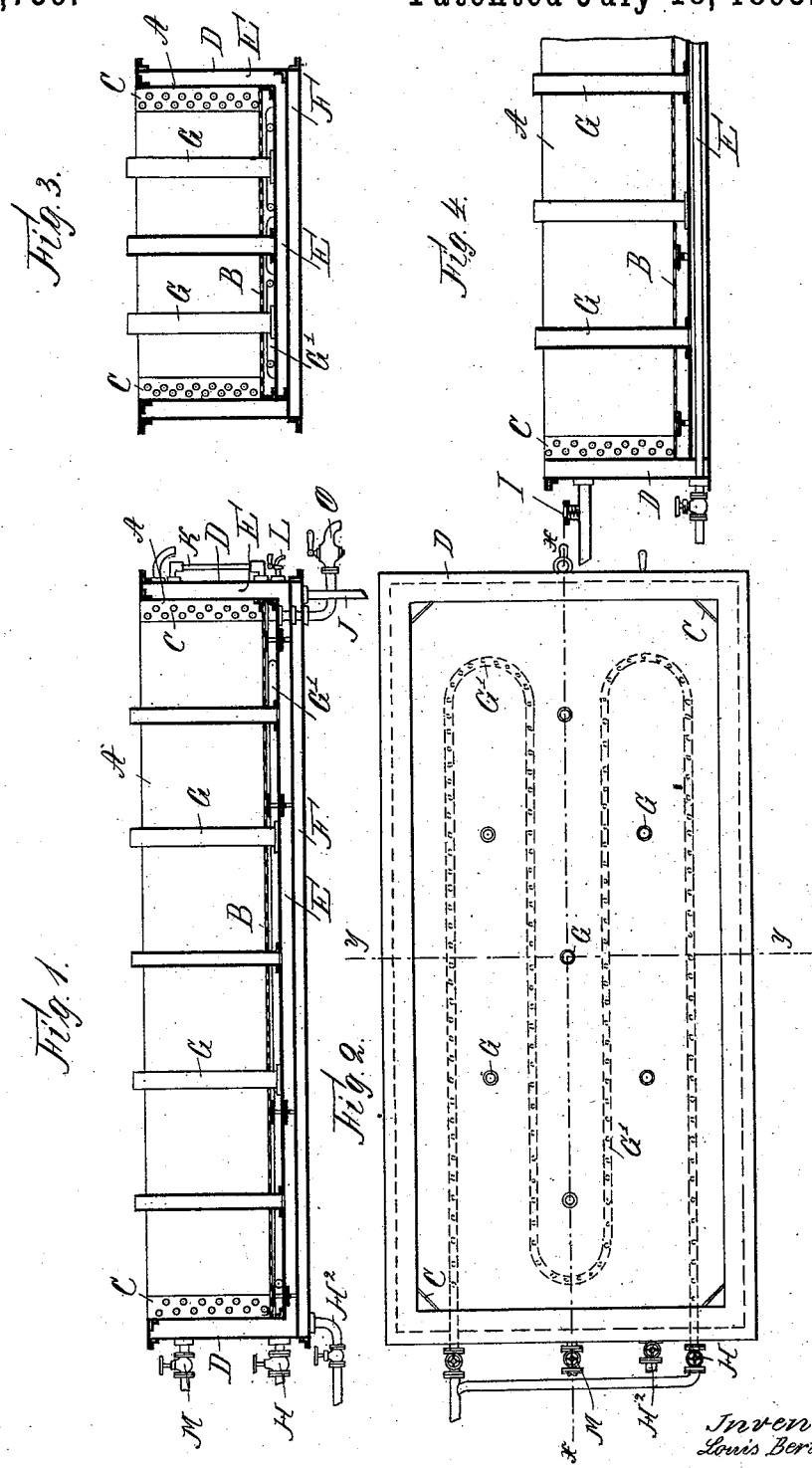
(No Model.)
L. BERTRAM.
APPARATUS FOR EXTRACTING GLUE.
No. 501,759. Patented July 18, 1893.
Witnesses.
R. Herpich.
H. Geneke
Inventor.
Louis Bertram.
by
Robert Dunler
Attorney.

LOUIS BERTRAM, OF BERLIN, GERMANY.

APPARATUS FOR EXTRACTING GLUE.

SPECIFICATION forming part of Letters Patent No. 501,759, dated July 18, 1893.

Application filed February 1, 1892. Serial No. 419,924. (No model.)

*To all whom it may concern:*

Be it known that I, LOUIS BERTRAM, a subject of the King of Prussia, German Emperor, and a resident of Berlin, in the Kingdom of Prussia, German Empire, have invented a new and useful Apparatus for Extracting Glue or Gelatine and Grease Out of Hide and Skin Waste at Low Temperature, of which the following is an exact specification.

My invention relates to an improved apparatus for extracting glue, or gelatine and grease out for hide and skin waste.

In order to obtain out of tanners' waste, *i. e.* the so called fleshings, cuttings, scrapings, hide and skin pieces, &c., hereinafter collectively called "the raw material" the entire or nearly the entire quantity of glue or gelatine and grease contained therein, and in order to obtain the glue pure and free from dirty matter and to preserve its highest strength and tenacity, it is indispensable to carry out the extraction as quickly as possible and to expose both the raw material and the glue liquid constantly forming itself to a comparatively low temperature only. I have ascertained by long and numerous experiments that on an average the temperature best answering the above said requirements is 75° to 85° Celsius equal to 167° to 185° Fahrenheit or about fifteen per cent. below boiling point.

I employ in my invention an apparatus constructed in a peculiar manner so as to enable the maker to work on this improved principle and thereby increase its yield of glue and better its quality. The apparatus may of course be made in various shapes, the one shown in the drawings annexed hereto being however the preferred form. The better to make my meaning clear I will proceed to describe the construction and operation of the apparatus as shown in the accompanying drawings, in which—

Figure 1 is a sectional elevation of the apparatus on line *x—x* of Fig. 2. Fig. 2 is a plan of the same. Fig. 3 is a cross-sectional elevation of the same on line *y—y* of Fig. 2. Fig. 4 is a sectional elevation, corresponding to Fig. 1, of a modification.

Similar letters refer to similar parts throughout the several views.

The apparatus consists of an inner vessel or cistern A made of sheet iron, tinned on the inner side, fitted a short distance above the bottom with a perforated horizontal sieve plate B of sheet iron tinned and four vertical corner sieve plates C likewise of sheet iron tinned. This inner vessel A, which is the extraction-room, is surrounded by an outer mantle D made of sheet iron and the intermediate space between the inner vessel A and outer mantle D forms a hot water chamber E. Below the bottom of this hot water chamber there is a third compartment F for the steam, which is introduced by means of a perforated pipe or in any other convenient manner.

In the inner vessel A, I place seven vertical hot water cylinders G made of sheet iron tinned on the outer side and open at their ends H. These cylinders are so disposed that there is an equal or nearly equal distance between themselves as well as between the outer ones and the sides of the inner vessel A. They emerge from the lower horizontal part of the hot water chamber E, cut through the sieve plate B and extend above the top edges of the inner vessel A, being either open at the top or closed in any convenient manner.

On the bottom of the inner vessel A below the sieve-plate B, I place a leaden steam-pipe G' with little holes for the purpose of boiling the "scutch" or residue of the raw material at the end of the extracting operation. The apparatus is further fitted in the usual way with steam-inlet valves H and $H^2$ for direct steam, a safety valve I giving way at a certain maximum pressure, a condensed steam escape pipe J, a water-gage K for the water chamber E, an escape cock L and an inlet cock M both for the water in the water chamber E, an escape cock O for the glue liquid flowing off. Instead of the steam compartment F a steam coil or serpentine pipe may be placed in the water chamber E as shown in Fig. 4 and the water heated by such steam coil or pipe, but I prefer the separate steam compartment. The water may also be heated in any manner prior to its admission into the water-chamber E, and thus the heating arrangement in the apparatus proper may be dispensed with.

I do not limit myself to the form of the example shown in the drawings.

The apparatus may also be constructed in a round or oval or any other shape that may be convenient under special local circumstances. The bottom part may be curved or bow bent as well as straight. Likewise the dimensions of the whole and the parts and the measurements of the intermediate chambers as well as thicknesses of the iron sheets may be varied according to the quantities and nature of the raw material to be worked. It is however preferable that the height of the inner vessel A and consequently the height of the raw material filled into same do not much exceed forty inches. The number of the vertical water cylinders G depends of course on the size of the apparatus. In very small apparatus they may even be dispensed with altogether, as in such case the heating surface of the hot water chamber E may be sufficient to secure speedy extraction. The material of the apparatus or parts of it may be not only iron, but also copper or any other metal that may be found suitable. The vertical water cylinders G may also be made removable by screwing them on at bottom or in any other manner.

The apparatus is used in this manner: I fill the water chamber E with water up to the top of the sides and give a little steam into steam compartment F to warm the water up to about 150° Fahrenheit. In the meantime I fill the inner vessel A with water to about one half its height and charge it with the raw material, which has before been washed in the usual manner and chemically treated, macerated or made tender according to its original degree of toughness, distributing the material equally and loosely over the entire area. I then give full steam and keep the same up. The temperature of the water in the water chamber E soon rises to near boiling point and remains there, and that of the liquid in the inner vessel A to about 170° or 180° Fahrenheit. After about two hours a large portion of the glue is formed and the water in vessel A being saturated with same to about twelve per cent. this first glue solution is drawn off. Then I add fresh water and proceed in the same way and if necessary repeat the same operation a third time. Meanwhile the grease has been constantly rising to the surface and removed in the usual manner. At last the residue or "scutch" containing now but very little glue and grease is covered with water and subjected to real boiling by giving steam into the leaden coil G' and letting the same operate directly on the residue through the little holes, whereby the last particles of glue and grease are liberated and obtained. The residue itself is finally taken out and pressed into cakes in the well-known manner or disposed of in the wet state as manure. The glue solutions are either cooled and cut and dried directly (where thin clear glues are desired) or, if it is intended to have thick, heavy glues like the so-called "scutch," concentrated in a vacuum pan or other concentrating apparatus to about from twenty-five to forty per cent. and then further treated as usual.

Having thus fully described the nature of my invention, what I desire to secure by Letters Patent of the United States is—

In an apparatus for extracting glue, gelatine and grease from animal matter or waste: the combination of an inner tank A, provided with a sieve bottom B and a perforated steampipe G' below the sieve bottom B, with a heating water-tank E surrounding the tank A, and having tubes G, inserted in the cover or top plate of tank E and extending above the latter, and with a steam chamber F, arranged under the water tank E, substantially as and for the purpose as described.

In testimony whereof I have signed this specification in the presence of two subscribing witnesses.

LOUIS BERTRAM.

Witnesses:
FR. SPULING,
R. HERPICH.